United States Patent
Eira et al.

(10) Patent No.: US 11,190,269 B2
(45) Date of Patent: Nov. 30, 2021

(54) METHOD AND SYSTEM FOR ASSIGNING SPECTRAL RESOURCES

(71) Applicant: Xieon Networks S.a.r.l., Luxembourg (LU)

(72) Inventors: António Eira, Amadora (PT); João Manuel Ferreira Pedro, Lisbon (PT)

(73) Assignee: XIEON NETWORKS S.a.r.l., Luxembourg (LU)

( * ) Notice: Subject to any disclaimer, the term of this patent is extended or adjusted under 35 U.S.C. 154(b) by 0 days.

(21) Appl. No.: 16/661,746

(22) Filed: Oct. 23, 2019

(65) Prior Publication Data

US 2020/0127733 A1    Apr. 23, 2020

(30) Foreign Application Priority Data

Oct. 23, 2018  (EP) .................................... 18202099

(51) Int. Cl.
*H04B 10/038*  (2013.01)
*H04B 10/079*  (2013.01)

(52) U.S. Cl.
CPC ....... *H04B 10/038* (2013.01); *H04B 10/0795* (2013.01)

(58) Field of Classification Search
CPC .. H04B 10/40; H04B 10/038; H04B 10/0795; H04J 14/0257; H04J 14/0271; H04J 14/0268; H04J 14/0295; H04L 41/0896; H04L 41/5025; H04L 41/5054; H04Q 11/0066; H04Q 2011/0086
USPC ......................................................... 398/1–8
See application file for complete search history.

(56) References Cited

U.S. PATENT DOCUMENTS

| | | | | |
|---|---|---|---|---|
| 8,873,962 B2 * | 10/2014 | Patel | ................... | H04J 14/0257 398/79 |
| 9,258,190 B2 * | 2/2016 | Swinkels | ........... | H04Q 11/0066 |
| 9,369,200 B1 * | 6/2016 | Schmidtke | ............ | H04L 69/324 |
| 9,369,785 B1 * | 6/2016 | Schmidtke | .......... | H04J 14/0268 |
| 9,860,012 B2 * | 1/2018 | Wright | ............... | H04J 14/0213 |
| 10,305,785 B2 * | 5/2019 | Huang | .................... | H04L 45/70 |
| 10,673,540 B2 * | 6/2020 | Becquet | ............. | G06F 13/4282 |
| 10,686,543 B1 * | 6/2020 | Al Sayeed | ............ | H04J 14/021 |
| 2012/0201541 A1 * | 8/2012 | Patel | ................... | H04J 14/0212 398/58 |
| 2012/0328296 A1 * | 12/2012 | Sullivan | .............. | H04J 14/0212 398/79 |

(Continued)

FOREIGN PATENT DOCUMENTS

| | | |
|---|---|---|
| WO | 2013/034201 A1 | 3/2013 |
| WO | 2015/052468 A1 | 4/2015 |
| WO | 2015/052468 A8 | 4/2015 |

OTHER PUBLICATIONS

Liu et al; Survivable Traffic Grooming in Elastic Optical Networks—Shared protection, Mar. 15, 2013, IEEE; pp. 903-909. (Year: 2013).*

(Continued)

*Primary Examiner* — Amritbir K Sandhu

(57) ABSTRACT

A method for assigning spectral resources comprises assigning spectral resources for a plurality of communication channels. The spectral resources for the plurality of communication channels comprise excess resources that are at least tentatively kept unoccupied. The excess resources of a plurality of communication channels are assigned to be spectrally contiguous.

26 Claims, 9 Drawing Sheets

(56) References Cited

U.S. PATENT DOCUMENTS

| | | | | |
|---|---|---|---|---|
| 2015/0288748 A1* | 10/2015 | Oh | ................... | H04L 67/10 |
| | | | | 709/203 |
| 2015/0333824 A1* | 11/2015 | Swinkels | ............ | H04J 14/0227 |
| | | | | 398/25 |
| 2016/0241353 A1* | 8/2016 | Wright | ................ | H04J 14/0257 |
| 2017/0134114 A1* | 5/2017 | Boertjes | ............. | H04Q 11/0062 |
| 2017/0142505 A1* | 5/2017 | Maamoun | ............ | H04J 14/0224 |
| 2017/0279526 A1* | 9/2017 | Bownass | .......... | H04B 10/07957 |
| 2018/0115384 A1* | 4/2018 | Wright | ................ | H04J 14/0267 |
| 2019/0313168 A1* | 10/2019 | Eira | .................. | H04Q 11/0062 |

OTHER PUBLICATIONS

Liu et al; Survivable Traffic grooming in Elastic Optical networks—Shared protection; Mar. 2013; Journal of lightwave technology, vol. 31, No. 6; pp. 903-909 (Year: 2013).*

Qiu et al; Resource-partitioned spectrum assigned to realized efficient multicasting for flexible grid optical networks; Oct. 2019; Optical Fiber Technology; pp. 1-8. (Year: 2019).*

European Patent Application No. 18202099.0, European Search Report Communication dated Apr. 24, 2019, 1 page.

European Patent Application No. 18202099.0, European Search Report dated Apr. 24, 2019, 5 pages.

Menglin Liu et al., "Survivable Traffic Grooming in Elastic Optical Networks—Shared Protection," J. of Lightwave Technology, vol. 31, No. 6, Mar. 15, 2013, pp. 903-909.

* cited by examiner

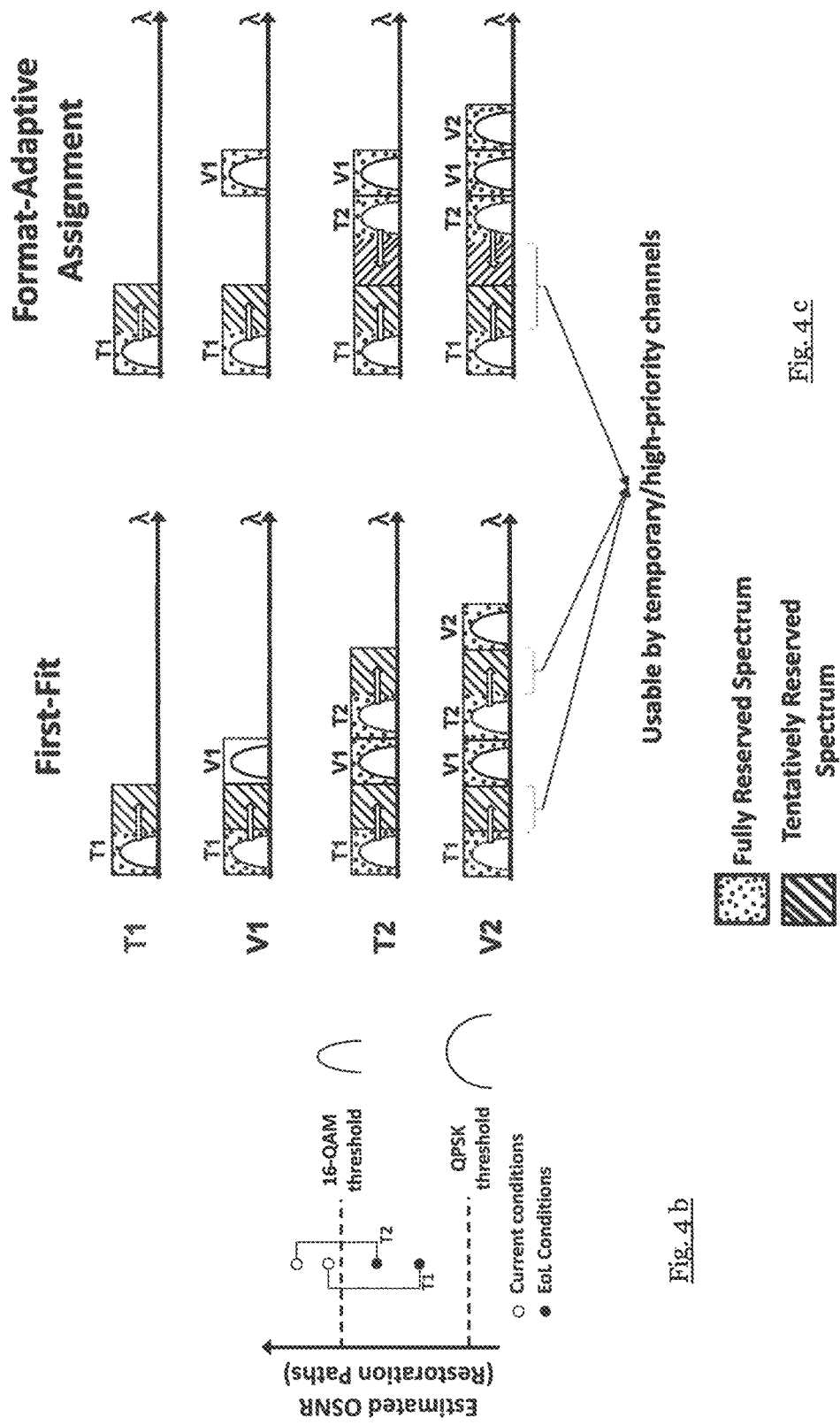

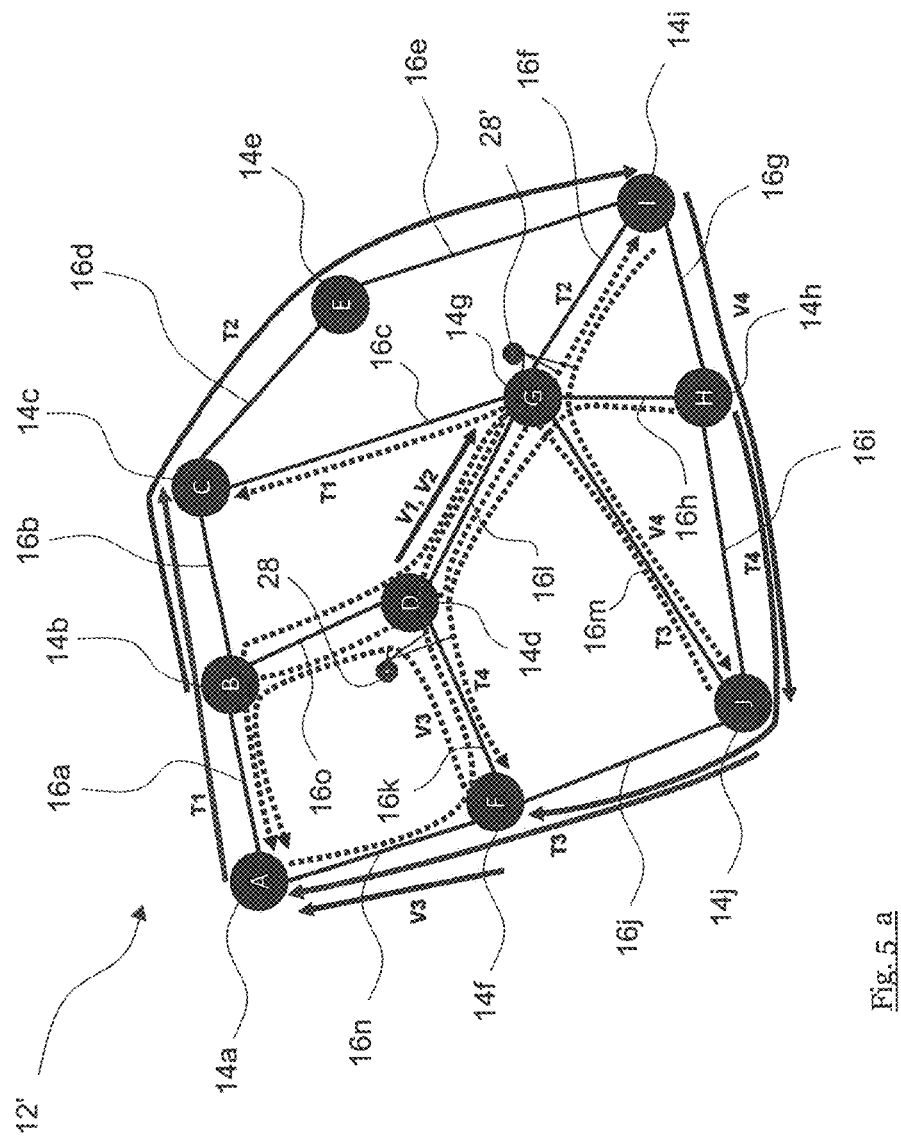
Fig. 5.a

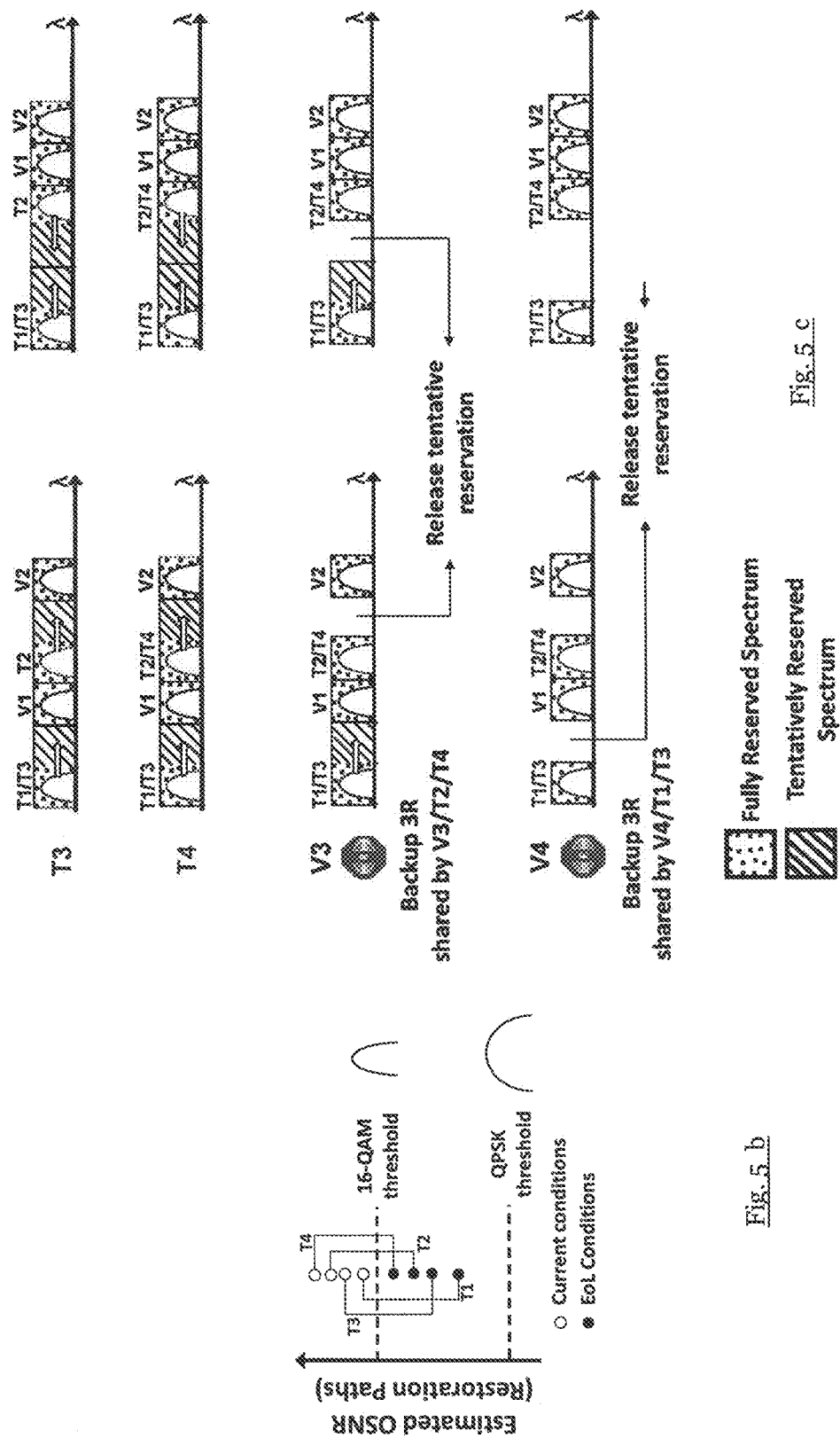
Fig. 5.b
Fig. 5.c

METHOD AND SYSTEM FOR ASSIGNING SPECTRAL RESOURCES

PRIORITY INFORMATION

This application claims priority to and the benefit of European Patent Application No. 18202099.0, filed in the European Patent Office on Oct. 23, 2018, the entire contents of which are incorporated herein by reference.

FIELD OF THE INVENTION

The invention relates to methods and systems for assigning spectral resources, in particular spectral communication resources in an optical communication network.

BACKGROUND AND PRIOR ART

Next-generation optical transponders are offering unprecedented levels of flexibility for service provisioning in optical communication networks. State-of-the-art modules are configurable in both the symbol rate and the modulation format, meaning that for a given target data-rate, they can be leveraged at the best possible spectral efficiency usable in a specific optical path. Concurrently, optical monitoring has greatly advanced in recent times, to the point where it is now feasible to characterize in near real-time the actual physical impairments present in deployed networks, and thus more accurately model the transmission feasibility of existing and candidate optical paths in an optical communication network.

Consequently, service providers are able to plan and operate their networks with less conservative approaches to optical design, by squeezing system margins to increase spectral efficiency and capacity. The adaptability of transponder modules, coupled with the reduced uncertainty associated to impairment effects, provide the means to operate networks with higher efficiency while maintaining sufficient flexibility to mitigate risk factors and to restore optical channels that fail.

Optical channel restoration may generally refer to the process of setting up a new optical channel in response to a failure affecting some working channel (e.g., a fiber link cut). Unlike protection schemes, wherein the traffic is replicated over the working and backup route, restoration is generally understood to denote a reactive procedure where the backup channel is turned up after a failure is detected. Therefore, while protection mechanisms are faster in response to failures, restoration enables backup resources (e.g., spectrum or backup regenerators) to be shared between multiple working channels that are unlikely to fail simultaneously (due to, for instance, not sharing any common links/nodes in the working path).

Restoration mechanisms can be purely dynamic or pre-planned. In the former, the control plane may calculate a route in response to failure and provision a backup channel accordingly. In pre-planned schemes, the resources to be used by the backup channel may be pre-configured (e.g., reserving spectrum and provisioning backup regenerators). Thus, dynamic methods offer additional flexibility in backup route computations, but incur the risk of not finding available network resources to setup the restoration channel. Pre-planned mechanisms ensure that these resources are provisioned and reserved for one or more restoration channels.

In this context, the use of symbol-rate-adaptive transponders and real-time monitoring can be leveraged to make restoration mechanisms more efficient, either by reducing the spectral resources required to serve traffic (and therefore increasing network capacity), or by decreasing the amount of regeneration elements in the network.

Ensuring network reliability is a key concern in optical transport. Hence, these networks are typically planned and deployed over so-called End-of-Life (EoL) conditions. In essence, this means that additional safety margins should be assumed regarding the transmission quality thresholds of optical channels. These margins are associated to effects such as component ageing or the uncertainty over the network components' physical characterization. As a result, in order to ensure reliability, the network must be planned and operated under worst-case scenario assumptions regarding, for instance, component characterization and ageing, the total power in each link, the mix of different modulation formats, etc. The obvious implication of always assuming the worst-case is that the network will be operated at either a lower throughput level, or a higher cost than what would be feasible.

The use of online monitoring enables performance models to more accurately reflect real-life network conditions and thus reduce the uncertainty margin over whether or not a specific lightpath has sufficient transmission quality. Reducing the uncertainty enables channel provisioning to be more aggressive, in the sense that it may be possible to employ a more spectrally-efficient transmission format, e.g., increasing the bits per symbol, or reducing Forward Error Correction (FEC) overhead.

However, while monitoring can provide a much more accurate depiction of current network conditions, and whether or not a given lightpath is feasible, usually the uncertainty associated with traffic conditions such as the number and mix of existing channels cannot be removed entirely. Hence, in many practically relevant scenarios channels must still be validated for EoL traffic conditions, albeit more relaxed ones due to better impairment characterization. In practice, the resources required (spectrum and/or regenerators) in the assumed worst conditions must still be available on demand, leading to an overprovisioning throughout network operation. This is particularly troublesome when the array of possible transmission formats increases, which makes the "worst-case" scenario in terms of performance more pessimistic, due to larger uncertainty over the mix of co-existing channel formats. Thus, there is a much greater potential gap between assumed EoL conditions and the actual deployment in terms of traffic and channel mix assumptions.

Planning with knowledge of current performance conditions has been recently put forward as a means to enable a more efficient use of resources. In P. Soumplis et al., "Network planning with actual margins," *IEEE/OSA Journal of Lightwave Technology*, vol. 35, no. 23, pp. 5105-5120, December 2017, an "actual-margins" planning algorithm is presented, where connections use the most efficient format enabled in current conditions. However, in this case, degradations are accommodated through deploying additional regenerators. Furthermore, the algorithm provisions connections under the assumption that existing connections (in current conditions) cannot be impacted by newly deployed channels. This policy can be counterproductive, since if a channel is deployed with very low margins and no spectral resources specifically provisioned for its widening, then maintaining its operation can severely limit the deployment options of channels sharing common links and unduly increase resource consumption. This can occur, for instance, if a very low optical signal-to-noise ratio (OSNR) margin on one channel effectively prevents any further channels from being deployed in the links it uses.

Shared restoration methods are well known and widely used in the industry. In the concrete case of leveraging symbol-rate and modulation format adaptive transponders, X. Cai et al., "Experimental demonstration of adaptive combinatorial QoT degradation restoration in elastic optical networks," *IEEE/OSA Journal of Lightwave Technology*, vol. 31, no. 4, pp. 664-671, February 2013, describes a scheme combining online re-routing and modulation format/symbol-rate adaptation in response to real—(or quasi-real)—time performance degradation monitoring. However, being a purely online method, it does not pre-plan backup resources and hence cannot ensure the availability of a restoration path for all traffic demands. Additionally, it does not offer any proactive mechanism to efficiently claim back the overprovisioned spectrum when it is no longer required.

In A. Morea et al., "Benefits of fine QoT-estimator to dimension spare resources in automatic restorable networks," in *Proc. International Conference on Transparent Optical Networks (ICTON)*, paper Mo.D4.4, July 2010, a pre-planned restoration optimization method is shown, wherein the number of backup regenerators is minimized by selectively choosing the restoration routes for each service. The authors further show how relevant a fine estimation of physical impairments can be in reducing the amount of overprovisioned resources. This approach does not consider the possibility of fallback restoration formats using alternative symbol-rates/modulation formats, and therefore has no potential spectral benefit to manage when network conditions change.

US 2017/0223436 A1 describes a method for defining attribute sets for protection/restoration connections. For the particular case of optical channels, these attributes include the modulation format, channel rate and spectral width, which can be used to apply fallback formats to the restoration channels dynamically. The disclosure does not consider the direct interworking between online monitoring capabilities and the pre-provisioning of restoration resources (i.e., restoration routes and formats can be computed dynamically, but the backup resources were not provisioned or optimized by the controller in line with the online monitoring results). More importantly, the management of the spectral resources is not addressed, implying that spectral gains from changing conditions are less concentrated and harder to leverage.

In U.S. Pat. No. 7,848,642 B1 and US 2017/317744 A1, the strategy employed to lower resource overprovisioning when providing reliability is to group services into different classes according to service level agreements, and prioritizing restoration for higher class services, including pre-empting reserved resources for lower class channels. This scheme has the obvious drawback of being applicable only to scenarios where such a priority differentiation can be clearly established and accepted.

Finally, U.S. Pat. No. 9,473,238 B2 presents a planning tool or network controller mechanism that, through measurements of network performance, can manage the gap between end-of-life performance and the current network state. As a result, corrective action can be taken in operation to ensure the proper functioning of the working channels, or alternatively the estimated margins can be reduced to enable a more aggressive provisioning of channels.

In view of the prior art, there remains a need for a more efficient assigning of spectral resources in optical networks that reduces the overprovisioning of spectrum and can be dynamically adapted.

OVERVIEW OF THE INVENTION

This objective is achieved with a method for assigning spectral resources according to independent claim 1, and a system for adaptively assigning spectral resources according to independent claim 11. The dependent claims relate to preferred embodiments.

A method for assigning spectral resources according to the disclosure comprises assigning spectral resources for a plurality of communication channels. The spectral resources for the plurality of communication channels comprise excess resources that are at least tentatively kept unoccupied, and the excess resources of a plurality of communication channels are assigned to be spectrally contiguous.

By providing excess resources for the plurality of communication channels, the network can be flexibly and dynamically adjusted later during operation, such as in response to increased network demand and/or deteriorating network components. Assigning the excess resources to be spectrally contiguous provides greater flexibility and allows for more efficient use of these resources in case they are needed, and hence reduces the overprovisioning of spectral resources.

The assignment of spectral resources can be adaptive. In particular, spectral resources for a communication channel can be initialized and/or updated throughout network operation, therefore resulting in a more dynamic and flexible network.

A communication channel, in the sense of the present disclosure, may denote any transmission path between a sender unit and a receiver unit that allows to transfer signals or information, or the mathematical or information-scientific representation of such a transmission path. Any signal or information carrier may be employed in the context of the present disclosure, including electrical optical carriers.

Spectral resources, in the sense of the present disclosure, may denote any resources that can be employed for the transfer of signals or information over the communication channel.

In an example, the communication channels are optical communication channels, in particular communication channels between components of an optical network, and the spectral resources are optical transmission resources.

For instance, the spectral resources can be wavelength resources or frequency resources, in particular wavelength intervals or frequency intervals assigned for information transfer.

Assigning the spectral resources may comprise allocating a size of the spectral resources, and/or allocating a position of the spectral resources within a spectrum, in particular within a wavelength spectrum or a frequency spectrum.

The excess resources may form part of the spectral resources, and may denote spectral resources that are not currently required for communication over the communication channel, but are pre-reserved or tentatively blocked and may be required at a later stage, such as in response to increased communication demand or a failure and/or a degradation of transmission components.

In an embodiment, the spectral resources may comprise reserved resources, in addition to the excess resources. The reserved resources may be occupied resources, in the sense that they are deemed required for communication over the communication channel.

Contiguous resources, in the sense of the present disclosure, may be resources that are spectrally adjacent to one another, such as have adjacent wavelength or frequency ranges.

The techniques of the present disclosure are particularly advantageous in a configuration in which restoration channels are assigned to the communication channels.

A restoration channel, in the sense of the present disclosure, may denote a transmission path or communication channel as described above, but may be specifically selected or designated to serve as a fallback channel in case the primary channel to which it pertains suffers a communication problem or a communication failure, such as a fiber link cut.

The restoration channel may share the starting point (sender unit) and/or the end point (receiver unit) with the primary channel to which it pertains.

The restoration channels are not occupied in normal network conditions, and hence can serve to provide ample excess resources that can be grouped and can be provided to accommodate additional communication channels later during network operations.

According to an embodiment, the method further comprises assigning at least one restoration channel for each communication channel among the plurality of communication channels; and assigning spectral resources for the restoration channels.

In an embodiment, the spectral resources for the restoration channels comprise excess resources that are at least tentatively kept unoccupied.

For instance, the entire spectral resources of the restoration channel may serve as excess resources, as long as they are not otherwise required or used in the network.

The excess resources may be assigned so that excess resources of a plurality of communication channels and/or restoration channels are adjacent to one another in the spectrum, such as have adjacent wavelength or frequency ranges.

According to an embodiment, the reserved resources of a plurality of communication channels and/or restoration channels are assigned to be spectrally contiguous to one another, and/or spectrally separated from the excess resources of a plurality of communication channels and/or restoration channels.

Grouping the spectral resources into a first group comprising contiguous excess resources for a plurality of different communication channels and/or restoration channels, and a second group comprising contiguous reserved resources for a plurality of different communication channels and/or restoration channels enhances the flexibility of re-assigning spectral resources at a later stage, and hence avoids an overprovisioning of resources.

In some examples, excess resources of the plurality of communication channels are grouped to be spectrally contiguous among one another in a first group of excess resources, and excess resources of the restoration channels are grouped to be spectrally contiguous among one another in a second group of excess resources different from the first group of excess resources.

In this configuration, excess resources pertaining to the plurality of communication channels and excess resources pertaining to the restoration channels are grouped separately.

In other examples, the excess resources of the plurality of communication channels and the excess resources of the restoration channels are jointly group to be spectrally contiguous.

The spectral resources and/or excess resources may be assigned in accordance with historical data and/or measured performance indicators and/or expected performance conditions pertaining to the communication channels and restoration channels, respectively. This allows for an efficient initial spectral assignment.

According to an embodiment, the spectral resources may be allocated in accordance with a given transmission form, such as a given optical transmission format.

The excess resources may be assigned to accommodate for a change to a different transmission format, such as a transmission format with a lower transmission efficiency, for instance a lower transmission capacity or a wider spectral occupation.

For instance, the spectral resources may initially be allocated in accordance with a 16-QAM transmission format, and the excess resources may be assigned so that they may accommodate a change to an 8-QAM transmission format in case the performance of the optical network deteriorates, such as due to aging.

In an embodiment, the method further comprises assigning occupation likelihoods to the excess resources.

The occupation likelihoods may represent a probability that the respective excess resources will be required by the communication channel and/or the restoration channel, respectively, such as at some point during operation, or within a given operation time interval.

In particular, assigning the spectral resources may comprise assigning a spectral position of the excess resources of a plurality of communication channels and/or restoration channels in accordance with the occupation likelihoods.

Excess resources with the same or a similar occupation likelihood can be grouped in the spectrum, so that the chance of having contiguous excess resources available for later re-assignment or for accommodating an extra channel increases. This enhances the flexibility of a dynamical and adaptive assignment of spectral resources during operation of the network.

As described above, the techniques of the present disclosure can be useful in facilitating an initial network planning and initial assignment of spectral resources for a given communication network, such as during a network planning stage. In addition, the techniques of the present disclosure are specifically adapted to be used in conjunction with an online monitoring of current network conditions/impairments and a dynamic adaptation of the network.

According to an embodiment, the method further comprises receiving monitoring results pertaining to a performance of the plurality of communication channels, and re-assigning the spectral resources and/or the excess resources for at least one communication channel among the plurality of communication channels and/or at least one associated restoration channel in accordance with the monitoring results.

For instance, the monitoring results may pertain to an optical signal-to-noise ratio (OSNR) of the plurality of communication channels.

In an embodiment, the method further comprises monitoring a performance of the plurality of communication channels, and re-assigning the spectral resources and/or the excess resources for at least one communication channel among the plurality of communication channels and/or at least one associated restoration channel in accordance with the monitoring.

Monitoring allows to update and re-assign resources in case the channel performance or OSNR changes during network operation, i.e. either improves such as due to replacement of network components with components of higher performance, or deteriorates such as due to aging of network components.

The method may comprise releasing at least part of the excess resources in accordance with the monitoring, such as when the expected channel performance improves and the excess resources therefore appear less likely to be required.

In response to the monitoring, the method may further comprise amending a transmission format of at least one communication channel among the plurality of communication channels in accordance with the monitoring results.

For instance, a detected deteriorating transmission performance may trigger a change to a lower-efficiency transmission format, which may then in turn require or entail the use of previously unoccupied excess resources.

A dynamic management of the excess resources may also allow to tentatively assign the excess resources of a given communication channel at least tentatively to a different communication channel that currently needs them. For instance, the different communication channel may be a channel that currently experiences a higher load, and hence requires resources beyond the excess resources originally assigned to that channel. In case the load of other channels in the network permits, these other channels may tentatively provide at least a portion of their excess resources to the channel experiencing the higher load. The spectral grouping of excess resources may facilitate such an assignment of excess resources to a different communication channel.

Hence, according to an embodiment the method further comprises assigning at least tentatively the excess resources to a different communication channel.

In an example, the excess resources may be assigned to the different communication channel in accordance with a priority parameter attributed to the different communication channel, and/or in accordance with an occupation likelihood attributed to the excess resources.

The occupation likelihood may represent a probability that the respective excess resources will be required by at least one communication channel among the plurality of communication channels, such as at some point during operation, or within a given operation time interval.

By assigning the excess resources in accordance with the priority parameter attributed to the different communication channel and/or in accordance with the occupation likelihood attributed to the excess resources, the priority of the different communication channel may be balanced against the risk that the excess resources will, against the odds, still be required by the channels that provide them.

In an aspect, the invention also relates to a computer program or to a computer program product comprising computer-readable instructions, wherein the computer-readable instructions are adapted, when read on the computer, to implement the method with some or all of the features described above.

In another aspect, the invention relates to a system for assigning spectral resources, comprising an assignment unit adapted to assign spectral resources for a plurality of communication channels. The spectral resources for the plurality of communication channels comprise excess resources that are at least tentatively kept unoccupied, and the excess resources of a plurality of communication channels are assigned to be spectrally contiguous.

The system may be adapted to perform a method with some or all of the features described above.

According to an embodiment, the assignment unit is further adapted to assign at least one restoration channel for each communication channel among the plurality of communication channels, and to assign spectral resources for the restoration channels.

The spectral resources for the restoration channels may comprise excess resources that are at least tentatively kept unoccupied.

The excess resources of the plurality of communication channels and/or restoration channels may be assigned to be spectrally contiguous.

According to an embodiment, the assignment unit is further adapted to assign occupation likelihoods to the excess resources, wherein the occupation likelihoods represent a probability that the respective access resources will be required by the communication channel and/or the restoration channel, respectively The assignment unit may be further adapted to assign a spectral position of the excess resources of the plurality of communication channels and/or restoration channels in accordance with the occupation likelihoods.

According to an embodiment, the system further comprises a monitoring unit adapted to receive monitoring results pertaining to a performance of the plurality of communication channels, and to provide the monitoring results to the assignment unit.

The assignment unit may be adapted to re-assign the spectral resources for at least one communication channel among the plurality of communication channels, and/or at least one associated restoration channel in accordance with the monitoring results.

According to an example, the monitoring unit may be adapted to monitor the performance of the plurality of communication channels.

In an embodiment, the assignment unit may be adapted to release at least part of the excess resources in accordance with the monitoring results.

According to an example, the system further comprises a format manager unit adapted to receive the monitoring results from the monitoring unit, and to amend a transmission format of at least one communication channel among the plurality of communication channels in accordance with the monitoring results.

According to an embodiment, the assignment unit and/or the monitoring unit and/or the format manager unit may be separate units that are communicatively coupled to one another.

In another embodiment, at least two of the assignment unit and/or the monitoring unit and/or the format manager unit may be integrated into a common unit.

In some examples, the assignment unit and/or the monitoring unit and/or the format manager unit are implemented in hardware. In other examples, the assignment unit and/or the monitoring unit and/or the format manager unit are implemented in software or firmware. In still further examples, the assignment unit and/or the monitoring unit and/or the format manager unit are implemented partly in hardware and partly in software/firmware.

According to an embodiment, the assignment unit is adapted to assign at least tentatively the excess resources to a different communication channel.

In particular, the assignment unit may be adapted to assign the excess resources to the different communication channel in accordance with a priority parameter attributed to the different communication channel, and/or in accordance with an occupation likelihood attributed to the excess resources, wherein the occupation likelihood represents a probability that the respective excess resources will be required by at least one communication channel among the plurality of communication channels.

BRIEF DESCRIPTION OF THE FIGURES

The features and numerous advantages of the method and system for adaptively assigning spectral resources according to the invention will be best apparent from a detailed description of specific embodiments with reference to the Figures, in which:

FIG. 4a-4c illustrate the assignment of spectral resources for an exemplary optical network according to an embodiment and in comparison with prior art techniques;

FIG. 5a-5c illustrate the assignment of spectral resources for the exemplary optical network according to another embodiment;

DETAILED DESCRIPTION OF EMBODIMENTS

Specific examples for a method and system for adaptively assigning spectral resources will now be described for the example of an optical communication network. However, the techniques of the present disclosure are not so limited, and may be applied to any other communication channel, such as communication channels relying on the transfer of electrical and electronic signals.

Figure 1:
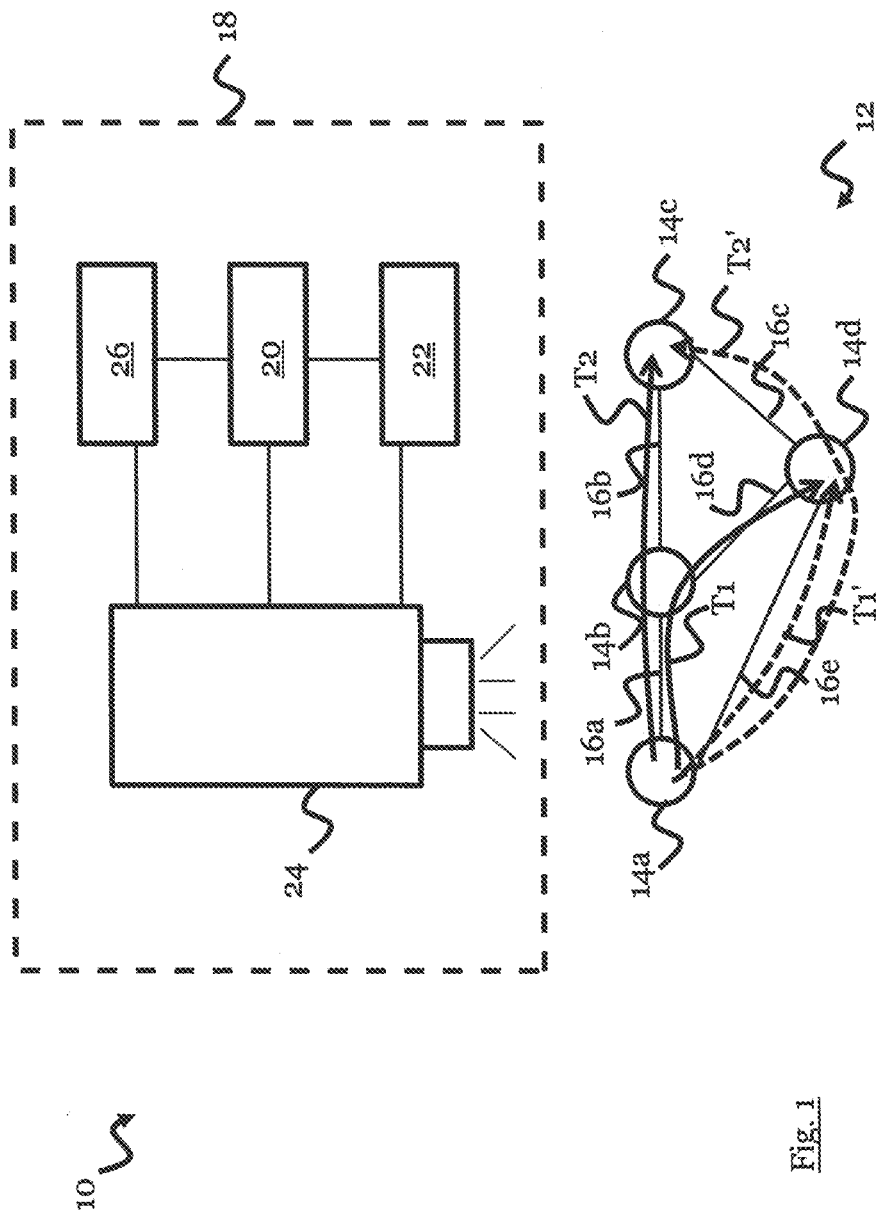
FIG. 1 is a schematic illustration of an optical communication environment in which a method and system for adaptively assigning spectral resources according to an embodiment can be employed.

FIG. 1 is a schematic illustration of an optical communication environment 10 in which the techniques according to the present disclosure can be employed.

The optical communication environment 10 comprises an optical network 12, which may comprise a plurality of network components or network nodes 14a to 14d that are linked by optical communication paths or edges 16a to 16e.

For instance, the optical network components 14a to 14d may be a Reconfigurable Optical Add/Drop Multiplexer (ROADM) or any other network component. The optical communication paths 16a to 16e may be sections of an optical fiber link, or any other carrier adapted to transport optical signals back and forth between the optical network components 14a to 14d.

The optical network 12 may be configured to transfer information in the form of optical signals in between the optical network components 14a to 14d via the optical communication paths 16a to 16e using an optical transmission format or standard, such as Quadrature Phase-Shift Keying (QPSK), 8-QAM (Quadrature Amplitude Modulation) or 16-QAM, and the assigned bandwidth. In accordance with the optical transmission format, a plurality of optical channels may be established between different optical network components 14a to 14d, wherein wavelengths or frequency resources may be assigned to any of these channels. For instance, the resources assigned for each channel may correspond to at least one wavelength interval or at least one frequency interval per channel.

FIG. 1 schematically shows a first channel T1 from optical network component 14a via optical network component 14b to optical network component 14d, and a second channel T2 from optical network component 14a via optical network component 14b to optical network component 14c. As can be taken from FIG. 1 and the above description, the channels T1 and T2 share the optical communication path 16a, and hence disjoint optical spectra should be assigned to the channels T1 and T2 in order to allow for simultaneous and interference-free information transfer via these channels.

FIG. 1 shows a simple toy network 12 with a relatively small number of network components 14a to 14d and communication paths 16a to 16e. However, this is for illustration purposes only, and it is one of the particular advantages of the present disclosure that its techniques can be efficiently employed to large networks comprising a high number of network components and communication paths.

The optical communication environment 10 further comprises a system 18 for adaptively assigning spectral resources. The system 18 comprises an assignment unit 20 adapted to assign spectral resources for the plurality of communication channels, such as the channels T1 and T2. For instance, the assignment unit 20 may assign different and non-intersecting wavelength intervals to the channels T1 and T2.

The assignment unit 20 may be additionally adapted to assign at least one restoration channel for each of the communication channels, such as the communication channels T1 and T2. The restoration channels may share the starting point and receiving point with the primary channel, and may serve as fallback options or secondary communication channels to which communication can be switched in case of a component failure or communication overload in one of the primary communication channels T1, T2.

For instance, the assignment unit 20 may assign a restoration channel T1' that links the network components 14a and 14d via the optical communication path 16e, and may hence serve as a fallback communication channel for T1. Communication could be switched from T1 to T1' in case network component 14b fails.

Similarly, the assignment unit 20 may assign a restoration channel T2' that links the network components 14a and 14c via network component 14d and the optical communication paths 16e and 16c. Communication could be switched from T2 to T2' in case of a broken optical fiber in the optical communication path 16b.

Assigning these restoration channels in advance, i.e., as part of the network planning may facilitate and speed up the network restoration later, in case of an actual failure.

As part of the network planning, the assignment unit 20 may also be adapted to assign spectral resources for the restoration channels T1', T2', analogously to the communication channels T1, T2. For instance, it can be taken from FIG. 1 and the above description that the restoration channels T1' and T2' share the optical communication path 16e, and hence the assignment unit 20 may assign disjoint optical spectra to the restoration channels T1' and T2'.

In addition to the spectral resources that are actively required for the communication, the assignment unit 20 may also assign, as part of the spectral resources, excess resources for the communication channels T1 and T2 and/or for the restoration channels T1' and T2'. These excess resources may not be required for communication initially, but are tentatively kept unoccupied in case they will be required for network operation at a later instance in time.

For example, the optical components 14a, 14b and 14d of optical communication channel T1 may be known to suffer from aging, resulting in a decrease in optical performance, such as their optical signal-to-noise ratio (OSNR). This may require a change to a lower-efficiency transmission format sometime during the lifetime of the optical network 12, which in turn may require higher bandwidth in order to preserve the throughput. The pre-assigned excess resources can be activated to provide the higher bandwidth when needed.

As another example, the optical communication channel T2 may experience a sudden and unexpected increase of throughput that was not initially envisioned at the time of the network planning. By resorting to the pre-assigned excess resources for the optical communication channel T2, this communication increase may be accommodated without affecting other communication channels, or even the need to re-plan the entire network.

The assignment unit 20 may assign the spectral resources and/or excess resources for the optical communication channels T1, T2 and for the restoration channels T1', T2' in accordance with historical data and/or expected performance conditions pertaining to the communication channels T1, T2 and restoration channels T1', T2', respectively. These parameters may be stored in a database unit 22 that forms part of the system 18 and may be communicatively coupled to the assignment unit 20.

FIG. 1 shows the database unit 22 as a separate and independent component of the system 18. However, in other examples the database unit 22 may be integrated into the assignment unit 20.

The assignment of spectral resources and excess resources will be described in additional detail with reference to FIGS. 2 to 7 below. In particular, in accordance with the present disclosure the excess resources of a plurality of communication channels and/or restoration channels are assigned to be spectrally contiguous, i.e. adjacent in the optical spectrum. As will be described in further detail below, this significantly enhances the flexibility of accommodating failures or communication impairments, and at the same time allows to react to changing communication patterns with minimum network interference. At the same time, the over-provisioning of network resources that would otherwise be necessary to ensure reliable communication is significantly reduced.

In some examples, the system 18 may further comprise a monitoring unit 24 that is communicatively coupled to the assignment unit 20. In some examples, the assignment unit 22 and the monitoring unit 24 may be combined into a single integrated unit.

The monitoring unit 24 may be adapted to receive monitoring results relating to a performance, such as a OSNR performance of the optical network 12. In some examples, the monitoring unit 24 may be equipped with sensors and may be adapted to monitor the performance of the plurality of communication channels T1, T2, optical network components 14*a* to 14*d* and/or optical communication paths 16*a* to 16*e*.

The monitoring unit 24 may provide these monitoring results to the assignment unit 20, and the assignment unit 20 may be adapted to re-assign the spectral resources for at least one communication channel among the plurality of communication channels T1, T2 and/or at least one associated restoration channel T1', T2' in accordance with the monitoring results. As will be described in additional detail below, this allows to dynamically adapt the optical network 12 in response to the current monitored performance of the optical network components 14*a* to 14*d* or the optical communication paths 16*a* to 16*e*. The excess resources of some of the communication channels that were previously left unoccupied may be occupied for future use, such as in response to a detected aging of optical network components 14*a* to 14*d*. Other excess resources may be released permanently in case it is determined, based on the monitoring results, that they will most likely not be needed anymore, such as not be required within a pre-determined operation time interval.

The monitoring unit 24 may be communicatively coupled to the database unit 22, and may provide performance indicators pertaining to the optical network 12 to the database unit 22 for storage. These collected performance values may assist the assignment unit 20 in assigning and/or re-assigning spectral resources for the optical network 12.

In some examples, the system 18 additionally comprises a format manager unit 26, which may be communicatively coupled to the assignment unit 20 and the monitoring unit 24. The format manager unit 26 may be adapted to receive the monitoring results from the monitoring unit 24 or, via the assignment unit 20, from the database unit 22, and may be adapted to amend the transmission format of at least one communication channel among the plurality of communication channels T1, T2 in accordance with the monitoring results. For instance, the monitoring may reveal that, due to aging effects of the optical network components 14*a*, 14*b*, and/or 14*d* a 16-QAM transmission may no longer be sustainable for the optical communication channel T1, and hence the format manager unit 26 may change the transmission format to 8-QAM. A corresponding information signal may be provided to the assignment unit 20, which may in response re-assign the spectral resources for the optical communication channel T1, as will be described in additional detail below.

FIG. 1 shows the format manager unit 26 as a separate independent unit. However, this is just an example, and in other examples the format manager unit 26 may be integrated into the assignment unit 20.

In some examples, the system 18 may be embedded into, or may form part of a network management system (NMS) or a software-defined networking (SDN) controller unit that manage the performance information of existing and tentative optical channels in the network 12.

Figure 2:
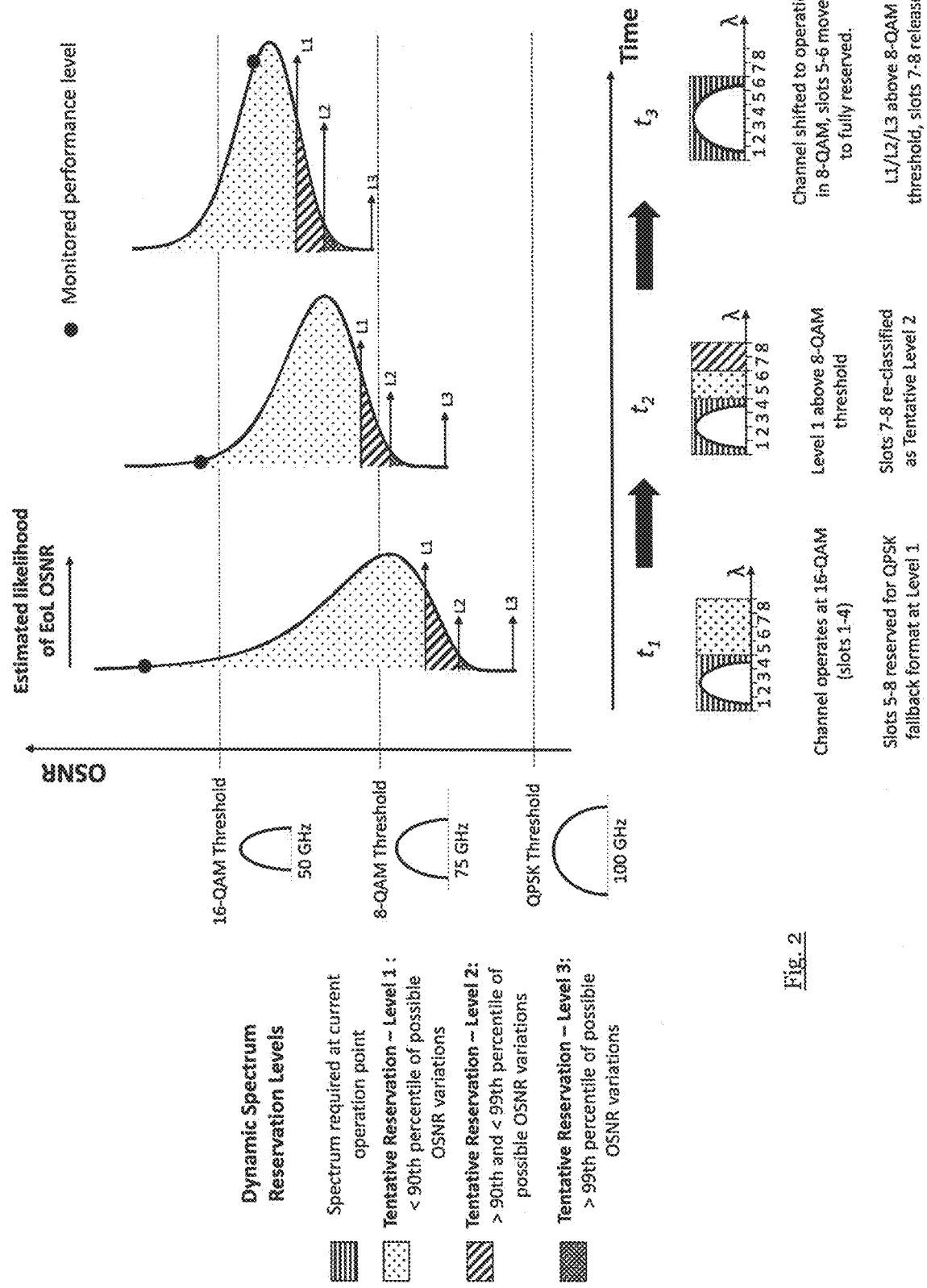
FIG. 2 shows a dynamic spectrum reservation hierarchy and an example of channel performance evaluation over time that can be employed for channel assignment in the context of the present invention.

An example of dynamic spectrum reservation and channel performance evolution over time with respective spectrum classifications will now be explained in additional detail with reference to FIG. 2.

The assignment unit 20 or database unit 22 may maintain, for each optical communication channel in the optical network 12, a list of the possible transmission formats (for the same target bit-rate) achievable by the transponder module in use. Each format may be associated to a fixed performance range (measured, for instance, through the OSNR) determining the most spectrally efficient format that is feasible at a given performance level, as FIG. 2 illustrates for an abstract exemplary optical communication channel.

At a given point in network operation, the monitoring unit 24 may relay the performance level of the optical communication channel to the format manager unit 26, enabling it to decide whether to maintain the current transmission format or use a higher/smaller bandwidth. In the case of working/protection channels, this decision can be delayed according to the availability of maintenance windows that allow for controlled channel disruption, whereas in the case of restoration channels the format update procedure can run continuously.

The spectral requirements assigned to the optical communication channel should account for the worst-case scenario in terms of performance degradation (EoL case). However, in many instances the format used throughout most (if not all) of the channel lifespan will be more efficient than that required for EoL conditions. Hence, keeping excess spectrum indefinitely provisioned for channel format adaptation will sometimes lead to undesirable spectrum overprovisioning and reduced capacity. In this disclosure, the spectral resources not being used by the actual optical signal (or the active restoration format configuration) are only tentatively reserved. This leaves the option for other services (with temporary and/or high-priority settings) to pre-empt these tentative assignments.

Furthermore, the concept foresees that tentative spectrum reservations may be hierarchically distributed according to the likelihood that they will indeed be necessary. This may be achieved by having the assignment unit 20 managing a dynamic threshold set, defining a likelihood estimation of a channel's performance varying by a pre-determined amount, as exemplified in FIG. 2. These thresholds can be dynamically updated by the controller based on the measured performance of the channel itself, but also on the evolving network conditions and their predicted impact on the channel (such as, e.g., the load evolution on the links crossed by the channel, or updates in the component ageing characterization). Note that as time evolves, the uncertainty associated with optical performance tends to decrease, allowing the spectrum to be managed more granularly around the operating point in many cases.

This threshold set thus defines the degree with which the assignment unit 20 may classify tentative excess spectrum reservations (softer or harder). This setting may define, for instance, the priority setting required by a new connection to pre-empt these spectral resources. For instance, a service request may be required to have a priority setting above the tentative classification threshold in order to pre-empt the excess resources. In another case, a sufficient improvement in operating network conditions (e.g., a traffic load evolving below worst-case expectations or a format mix less heterogeneous than expected) may even allow a tentative excess spectrum slot to be permanently released (unassigned from its original channel) by the assignment unit 20.

The hierarchical classification of spectrum slots enables not only a more granular management of connections with different requirements, but also a pro-active spectrum assignment process.

The assignment unit 20 may assign connections with tentative excess spectrum reservations contiguously. In this way, spectrum slots which share the same links, and which have similar likelihoods of not being required in the future, will tend to be assigned next to each other in order to maximize the available contiguous spectral space to be used by other connections, improving the average network capacity in the long term.

Figure 3:
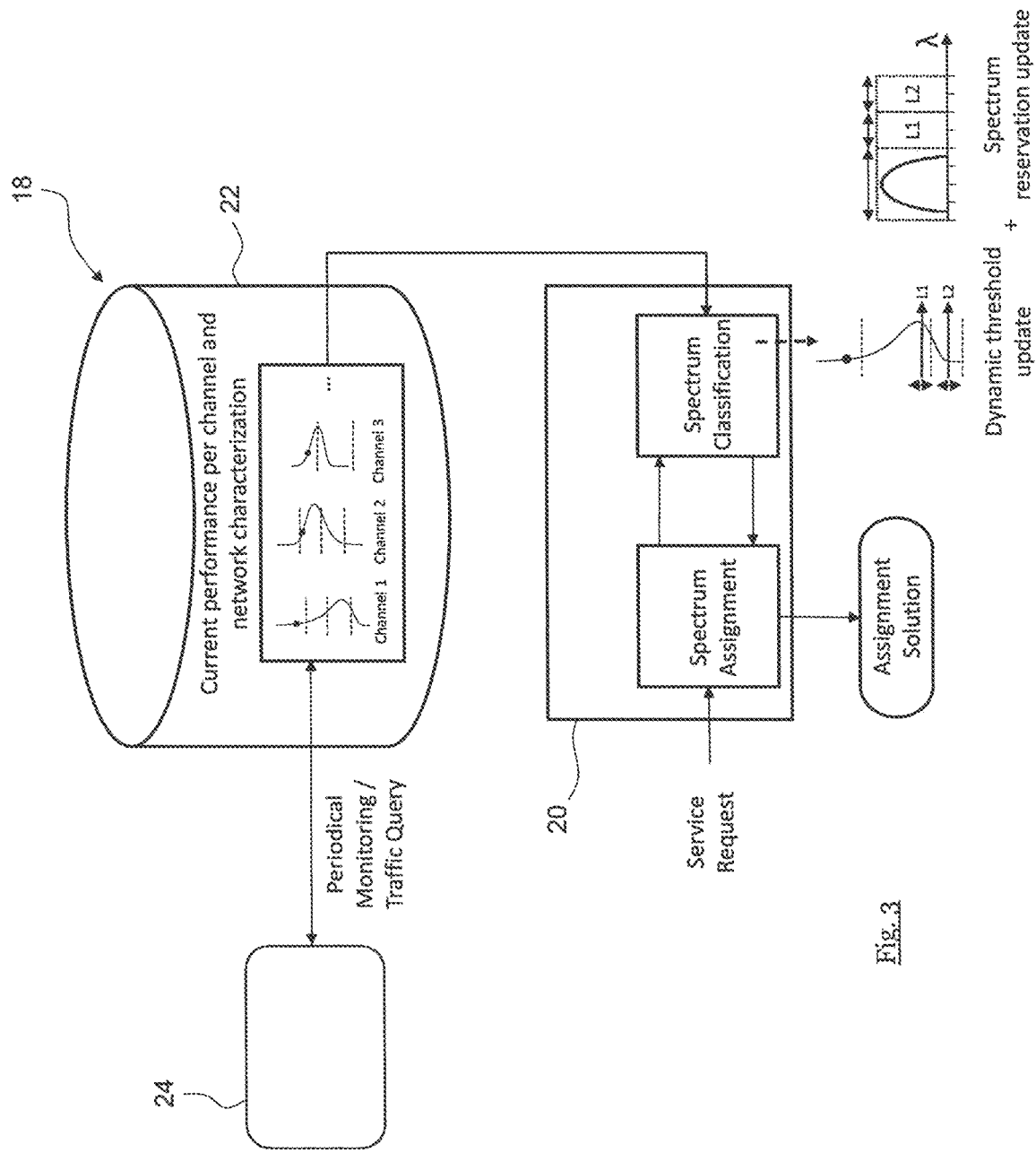
FIG. 3 is a schematic illustration of a system for adaptively assigning spectral resources according to an embodiment.

FIG. 3 illustrates the system 18 and its operation of adaptively assigning spectral resources in additional detail and shows how the techniques of the present disclosure beneficially intertwine the initial network planning and a priori spectrum assignment with an online performance assessment.

In an embodiment, the database unit 22 periodically queries the monitoring unit 24 and thereby obtains performance data from established optical communication channels periodically. The assignment unit 20 employs this information to maintain a periodical record of the current transmission quality (e.g., OSNR margin) for each optical communication channel present in the optical network 12. Additionally, based on a historical/monitored characterization of the network environment (such as, e.g., channel loads per link, component ageing parameters) provided by the database unit 22, the assignment unit 20 may produce a per-channel estimation of how likely an OSNR degradation/improvement over the current operating point is.

The assignment unit may relate this information to the format manager unit 26, which may juxtapose the operating point over transmission quality thresholds for each possible channel format. This module thus decides whether the current transmission format can be maintained or must be downgraded/upgraded.

Recall that for live channels running in the network (working/protection), a format change may be scheduled for a maintenance window or employ some non-disruptive adaptation method, whereas for idle restoration channels the format configuration may be continuously updated.

In the assignment unit 20, the performance information from the database unit 22 is combined with a defined spectrum reservation hierarchy, as illustrated above with reference to FIG. 2. The per-channel performance evolution estimation sets the OSNR degradation/improvement ranges that correspond to each spectrum reservation level. The thresholds bordering these ranges allow the assignment unit 20 to trigger a re-classification of the spectrum assigned to each channel between the various hierarchy levels:

Degradations in performance over expected values may result in spectrum slots being re-classified with higher (harder) reservation levels.

Improvements in performance over expected values may result in spectrum slots being re-classified with lower (softer) reservation levels, or being released entirely.

At any given point in time, there may be excess spectrum reserved for every channel according to its current operating format. Additional excess spectrum may be reserved according to the relationship between the dynamic reservation levels and the quality of transmission thresholds for each format.

This tiered spectrum classification for each individual spectrum slot may be used to interwork with the spectrum assignment. Here, incoming services with requests for spectrum provisioning may be handled with the knowledge of which spectrum is occupied, which is free, and which is tentatively occupied with varying degrees of priority. The purpose of this interworking may be useful for the following cases:

Incoming services with particular classes (e.g., temporary or high-priority) may be accommodated using tentatively reserved excess spectrum below the specified priority.

Incoming services which themselves will require tentatively assigned excess spectrum may be assigned adjacently to other tentatively assigned excess spectrum slots, in order to maximize the benefit of potentially reclaiming these slots later on in network operation.

Incoming services not requiring tentatively assigned excess spectrum, and using links where tentatively assigned excess spectrum is present, should preferentially not be adjacent to such spectrum, in order to facilitate the assignment in the previous point.

A service provisioning workflow may thus query the spectrum assignment, which in turn inquires with the spectrum classification on the current status of each spectrum slot. For each possible (feasible) spectrum slot assignment, the assignment unit 20 may compute a score that measures the adaptability of such a solution to performance variations in the network. The calculation of this score can include metrics such as (but not limited to):

The amount of tentatively assigned excess spectrum slots (with any priority level) that are immediately adjacent to the current assignment in any link of the optical communication channel under consideration.

The amount of tentatively assigned excess spectrum slots (with any priority level) that are immediately adjacent to the current assignment in any link directly connected to the ones in the optical communication channel under consideration.

A linear combination of the amount of tentatively assigned excess spectrum slots that are adjacent to the current assignment in any link of the optical communication channel under consideration. Such a linear combination can comprise, for instance, a weight for each adjacent tentatively reserved spectrum slot. Said weight may reflect the reservation level of the tentatively assigned slot, such that slots with lower priority levels will contribute to a higher score, i.e., slots more likely to be reclaimed may take precedence in being adjacently placed to other tentative excess spectrum reservations.

In the case of channel provisioning that does not require the assignment of tentative excess spectrum, the aforementioned score may acts as a criterion to be minimized in the spectrum assignment process. In this way, channels with only fully reserved spectrum are preferentially mapped to spectrum slots not directly adjacent to tentative spectrum. Conversely, when provisioning channels that require tentatively assigned excess spectrum, the score introduces a maximization criteria in order to group sets of potentially "claimable" excess spectrum slots together. Note that this criterion can be used by itself, or in conjunction with other commonly used criteria for spectrum assignment An illustrative example of the operation and advantage of this spectrum assignment method is now provided with reference to FIGS. 4a to 4c for the case of connections with shared restoration.

Figure 4A:
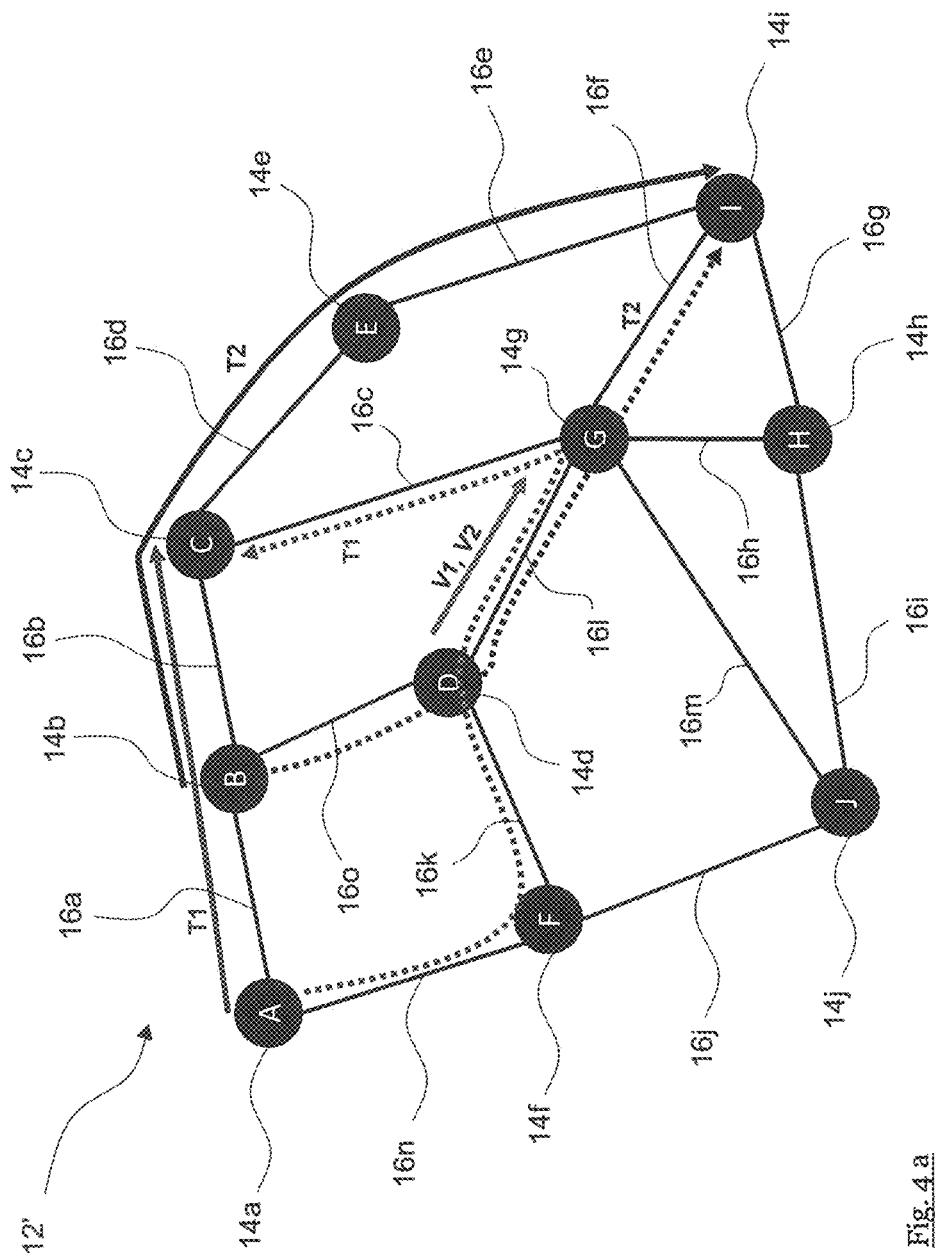

FIG. 4a shows a network topology 12' with a plurality of optical network components 14a to 14j and interlinking optical communication paths 16a to 16o that is somewhat larger and more complex, but otherwise analogous to the optical network 12 described above with reference to FIG. 1

Given the network topology 12' shown in FIG. 4a, a set of services requiring working and restoration paths shall be deployed over time. For simplicity, it is assumed that only two classification levels for reserved spectrum exist: fully reserved/occupied and tentatively reserved, where tentative reservations are excess resources that apply for worst-case EoL conditions.

Channels T1 and T2 are shown in solid lines in FIG. 4a, and corresponding restoration channels are shown in broken lines. The restoration channels both require restoration paths that cross the link 16l between the optical network components 14d and 14g. Furthermore, it is assumed that their performance in current network conditions is sufficient to operate using a 16-QAM modulation format, but that in EoL conditions these channels must fall back to using QPSK with a higher symbol-rate (and hence a wider channel), as illustrated in FIG. 4b. Therefore, the spectrum assigned to these demands must include tentatively reserved excess spectrum to accommodate a fallback from 16-QAM to QPSK if network conditions degrade.

Other services or channels V1, V2 also require spectral resources in link 16l. Assuming the service provisioning order is (T1, V1, T2, V2), let us analyze a comparative operation of a common spectrum assignment technique (First-Fit) and the proposed method according to an embodiment, termed format-adaptive assignment, and its impact on link 16l between nodes D-G, as illustrated in comparison in FIG. 4c.

The restoration channel of T1 is assigned two spectrum units, one fully reserved and the other tentatively reserved. Channel V1 is assigned afterwards. In a First-Fit approach, V1 is placed directly adjacent to T1. The proposed format-adaptive assignment method acknowledges that this may limit the options for exploring the tentatively assigned spectrum of T1, and thus assigns V1 to a spectral position that allows another piece of tentatively assigned spectrum to be placed next to T1 in the future When demand T2 is provisioned on the restoration channel B-D-G-I, it cannot use the same restoration spectrum as T1, since it shares the working link B-C with T1. Hence, it must be assigned a spectrum slot disjoint from T1 in the restoration channel. As T2 also requires tentatively assigned excess spectrum, this method will identify the spectrum slot between T1 and V1 as the most suited for deployment, as it fulfills the criterion of maximizing adjoining tentative excess spectrum assignments.

One advantage of the proposed method is already clear in this instance. In current network conditions, which allow the operation of T1 and T2 with 16-QAM on the restoration format, any temporary or high-priority demand requiring two units of spectrum can be assigned between T1 and T2. On the contrary, a controller unaware of which spectrum is tentatively assigned, will produce a spectral mapping that limits the possibility of reusing said spectrum This optimized reuse of tentatively assigned excess spectrum can be expanded to scenarios where network conditions change more definitively, as will now be described with reference to FIGS. 5a to 5c.

Reusing the network topology of FIG. 4a, let us assume that further demands are provisioned in this scenario. As FIG. 5a illustrates, optical communication channels T3 and T4 fall under the same performance window as T1 and T2 (currently valid with 16-QAM, but not in EoL conditions). Service T3 between nodes J and A uses working channel J-F-A and restoration channel J-G-D-B-A. This restoration channel can be provisioned in the same spectrum as T1 or T2, as its working path does not intersect either of them. T3 is thus provisioned in co-existence with T1. Similarly, when T4 is provisioned, it may share the restoration spectrum with T2 (but not with T1/T3, as it shares a working link with the latter).

Then, let us assume that a new service V3 between nodes F and A uses working channel F-A, and restoration channel F-D-B-A. Assume also that for this channel a regenerator unit 28 is placed at node 14d in order to ensure a transparent connection. The restoration channels of V3, T1 and T4 can effectively share this backup regenerator unit 28. Consequently, two shorter lightpaths with reduced transmission reach are created in each of the three restoration channels. Therefore, the tentatively assigned excess spectrum to T1 and T4 can be released by the assignment unit 20 as the restoration connections now fully meet EoL conditions, as illustrated in FIG. 5c.

In a similar way, a new demand V4 between nodes I and J requires a working channel I-H-J and restoration channel I-G-J. Assuming a backup regenerator unit 28' is placed at node 14g, it can be shared between V4, T2 and T3. The tentatively assigned excess spectrum to T2 and T3 can thus be released as well, as illustrated in FIG. 5c. In this scenario, the proposed method's benefit of producing a wider available spectrum slot (as opposed to multiple smaller slots) extends to all types of connections, as the spectrum was effectively released for generalized use by any connection type. Situations involving the release of spectrum can originate from external effects, such as placement of backup regenerator units 28, 28' and demands being torn down, or from the organic evolution of the traffic itself, which may differ significantly from the forecasted worst-case EoL scenario (e.g., in terms of channel type mix or aggregate power levels). In these cases, the natural tendency as time lapses is for the uncertainty regarding EoL conditions to decrease.

In next-generation deployments with multiple possible channel formats, it is far more likely that the EoL conditions assumed at the onset of deployment and those that are actually verified vary substantially in terms of deployable lightpaths. Network monitoring enables the assignment unit 20 to gradually correct this gap. This technique further provides a mechanism to ensure that any spectral benefit arising from such correction can be more effectively used.

The examples provided above with reference to FIGS. 4c and 5c compare an example embodiment of the inventive method with a first-fit wavelength assignment strategy. Naturally, many other spectrum assignment methods could be used instead of First-Fit. However, none of them will directly manage tentatively assigned excess spectrum directly, implying that the overall benefit of grouping such assignments together may only be incidentally achieved.

Figure 6A:
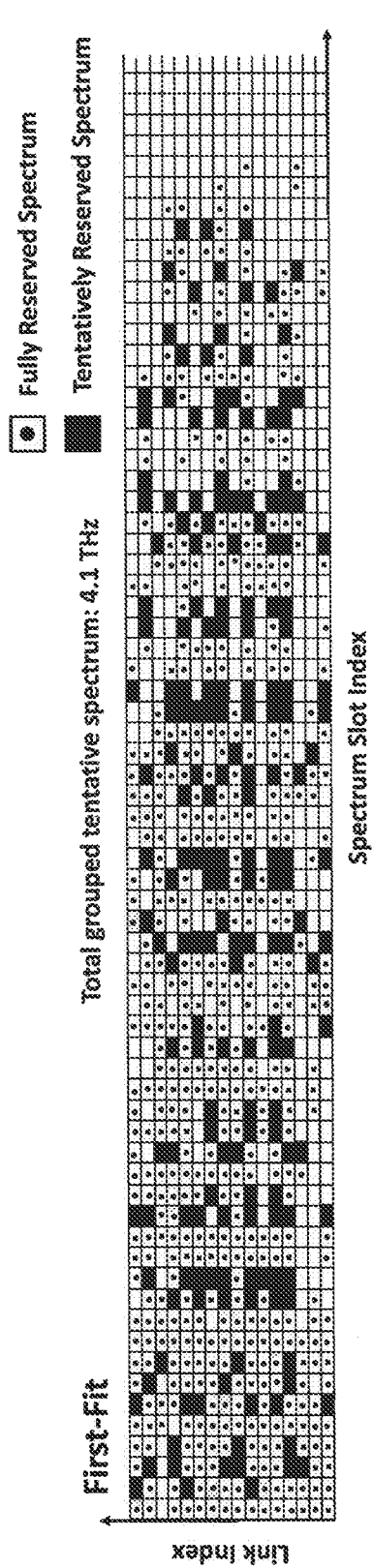
FIG. 6a-6b show results of spectral assignment performance according to an embodiment and in comparison with prior art techniques.
Figure 6B:
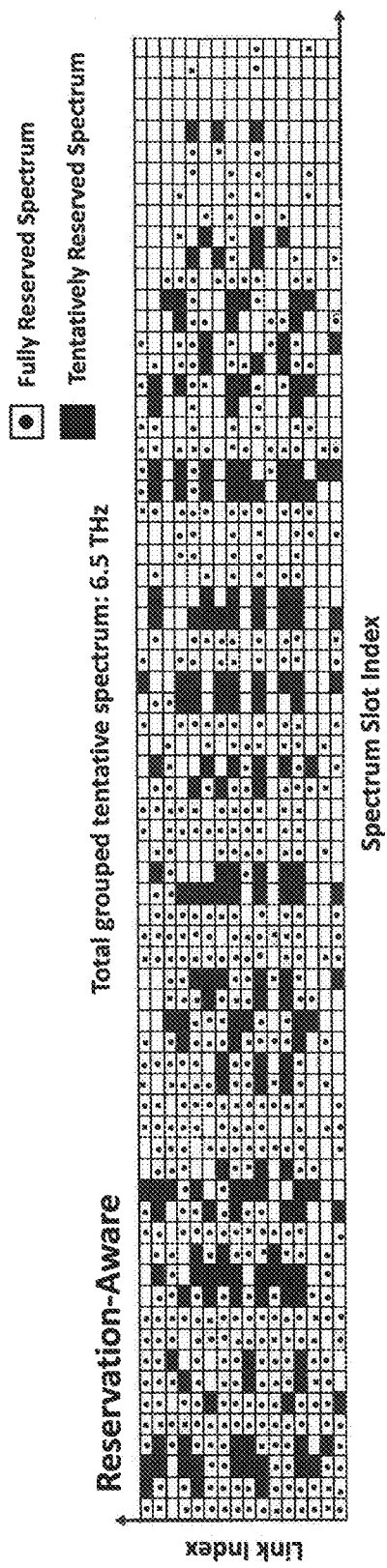

To further illustrate this effect, FIGS. 6a and 6b shows a spectral mapping for an entire network using the proposed method (FIG. 6b) in comparison with a first-fit approach (FIG. 6a), assuming 32 Gbaud 16-QAM and 64 Gbaud QPSK formats available. The inventive mapping according to the embodiment presents a roughly 60% overall increase in the tentative assignment groupings when using format-adaptive assignment, compared with traditional first-fit.

These specific examples address only two possible channel formats for simplicity. The concept is extendable to multiple formats co-existing, and also to multiple fallback formats (where there may be several overlapping "layers" of tentatively reserved spectrum).

Figure 7:
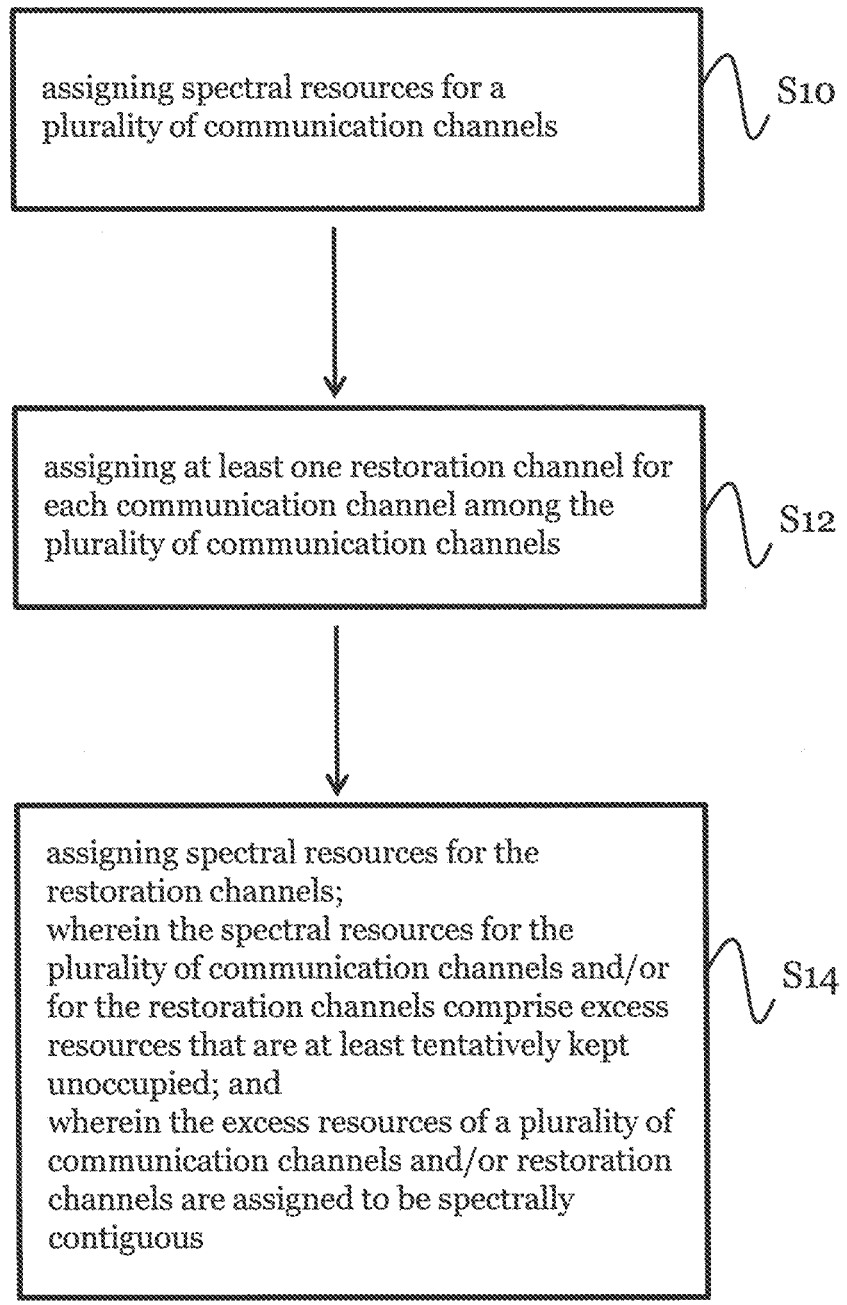
FIG. 7 is a flow diagram illustrating a method for adaptively assigning spectral resources according to an embodiment.

FIG. 7 is a schematic illustration of a flow diagram of a method for adaptively assigning spectral resources according to an embodiment.

In a step S10, spectral resources are assigned for a plurality of communication channels.

In a step S12, at least one restoration channel is assigned for each communication channel among the plurality of communication channels.

In a step S14, spectral resources are assigned for the restoration channels. The spectral resources for the plurality of communication channels and/or for the restoration channels comprise excess resources that are at least tentatively kept unoccupied. The excess resources of a plurality of communication channels and/or restoration channels are assigned to be spectrally contiguous, such as described above for the examples of FIGS. 4 and 5.

While FIG. 7 shows steps S10, S12, S14 in an exemplary order in which step S10 precedes step S12, and step S12 precedes step S14, other embodiments may comprise steps in a different order.

The method may allow optical channels to be operated under the relaxed performance assumptions enabled by online monitoring, while simultaneously ensuring adaptability of the assigned resources in case of both positive and negative performance deviations over the assumed EoL thresholds. The method may foresee a spectrum management mechanism intertwined with the performance assessment module, wherein spectrum may be allocated for channels in the strict amount needed given the current network conditions (e.g., for the most spectrum-efficient feasible channel format). Furthermore, additional excess spectrum may be pre-reserved adjacently to each channel as a safeguard for any degradation that may compromise its feasibility (up to the assumed EoL levels). In the event that the network controller or assignment unit 20 is made aware that a given degradation threshold requiring a transmission format change has been reached, the format of the affected channel may be switched to a wider channel with more physical impairment resiliency maintaining transparent end-to-end connectivity.

These format shifts may be enabled by next-generation symbol-rate adaptive transponders, which are able to perform these operations quickly and without requiring the deployment of additional modules. In the case of working/protection channels, which are continuously running in the network, these shifts may be scheduled for pre-defined maintenance windows, where the traffic disruption is controlled and minimized. For restoration channels, since they are idle until a specific failure occurs, the "active" restoration channel formats may be updated based on the current performance thresholds, assuming the relevant spectrum and/or regeneration resources have been provisioned accordingly.

Note that, at least in the restoration case, it would theoretically be possible for the control plane to continuously update the restoration routes, based on the current network conditions. However, some restoration routing paths may require multiple lightpaths divided by regenerators, which must be available at specific intermediate nodes. In this scenario, the pure online path computation may not find a feasible restoration route due to a lack of available regenerators. Alternatively, additional regenerators may be placed as a safeguard at multiple nodes, but this would be a very costly solution.

Overall, the described scenario presents a situation where channel performance may be accurately monitored and optical channels can be dynamically re-configured between different transmission formats. However, due to uncertainty over the future traffic outlook and its impact on optical performance, resources such as spectrum and regenerators may still need to be provisioned in accordance with EoL criteria. The excess spectrum required implies that overall network capacity is diminished, while the extra regeneration entails additional deployment costs. Both these aspects are typically crucial in the dimensioning and operation of optical transport networks. However, precisely because EoL scenarios in these conditions tend to be overly pessimistic, there is a high likelihood that much of the spectrum provisioned as a safeguard will in fact not be required at all throughout network operation.

The present method provides a means to more efficiently exploit symbol-rate-adaptive transponders, and real (or quasi-real) time impairment monitoring capabilities, in order to optimize the routes, spectral assignments and formats of restoration channels. In one aspect, the method may include a spectrum classification that distinguishes between spectrum required for the current network operation in acceptable conditions, and excess spectrum that is pre-reserved in order to accommodate the widening of channels due to performance degradations. Furthermore, this classification may be used to pro-actively manage the spectral assignment of channels, such that spectrum that can be claimed back due to EoL assumptions not materializing can be more effectively used in other applications.

Therefore, the provisioning ensures that, if worst-case EoL assumptions do materialize, the deployed channels may be guaranteed to have available resources for their correct operation. Concurrently, the usefulness of tentatively reserved spectrum may be maximized if EoL conditions can be definitively relaxed due to: (i) a favorable evolution of network performance (e.g., in terms of deployed modulation formats and link loads), or (ii) external elements (such as backup regenerators) being deployed in the network.

In some examples, the combined effects of the integrated threshold-based performance management with the spectrum classification and assignment allow a more efficient operation where:

The network operates at the highest efficiency level enabled by current real-time monitoring (tentatively reserved spectrum can be used by temporary/high priority connections).

A negative evolution of performance parameters relative to the expectation is safeguarded by pre-planning the fallback format(s) for channels, and pre-reserving the required spectrum accordingly.

Any such pre-reserved spectrum that can be released due to favorable network conditions (e.g., due to overly pessimistic traffic/impairments estimation, or incremental placement of backup regenerators) has a maximized utility due to being preferentially assigned in slots where it is more likely to be reused later on.

The description and the figures merely serve to illustrate the invention, but should not be understood to imply any limitation. The scope of the disclosure is to be determined from the appended claims.

REFERENCE SIGNS 10 communication environment
12, 12' optical network
14a-14j optical network components
16a-16o optical communication paths
18 system for adaptively assigning spectral resources
20 assignment unit
22 database unit
24 monitoring unit
26 format manager unit
28, 28' regenerator unit

What is claimed is:
1. A method for assigning spectral resources, comprising:
assigning first spectral resources for a first communication channel, the first spectral resources comprising:
  first fully reserved spectral resources that are fully reserved for the first communication channel; and
  first excess spectral resources tentatively reserved for the first communication channel;
  wherein the assignment of the first spectral resources enables the first communication channel to:
    communicate traffic according to a first transmission format of the first communication channel using, to the exclusion of the first excess spectral resources, at least a portion of the first fully reserved spectral resources; and
    communicate traffic according to a second transmission format of the first communication channel using at least a portion of the first fully reserved spectral resources and at least a portion of the first excess spectral resources, the second transmission format of the first communication channel being an alternative transmission format relative to the first transmission format of the first communication channel;
assigning second spectral resources for a second communication channel, the second spectral resources comprising:
  second fully reserved spectral resources that are fully reserved for the second communication channel; and
  second excess spectral resources tentatively reserved for the second communication channel;
  wherein the assignment of the second spectral resources enables the second communication channel to:
    communicate traffic according to a first transmission format of the second communication channel using, to the exclusion of the second excess spectral resources, at least a portion of the second fully reserved spectral resources; and
    communicate traffic according to a second transmission format of the second communication channel using at least a portion of the second fully reserved spectral resources and at least a portion of the second excess spectral resources, the second transmission format of the second communication channel being an alternative transmission format relative to the first transmission format of the second communication channel;
assigning third spectral resources fully reserved for a third communication channel;
wherein the first excess spectral resources are assigned to be spectrally contiguous to the second excess spectral resources; and
wherein the first spectral resources, the second spectral resources, and the third spectral resources are assigned such that the third spectral resources are spectrally contiguous to at least one of:
  the first fully reserved spectral resources;
  the second fully reserved spectral resources.

2. The method according to claim 1, further comprising:
assigning a first restoration channel for the first communication channel;
assigning a second restoration channel for the second communication channel; and
assigning the third spectral resources for the first restoration channel, the third spectral resources comprising third excess spectral resources that are tentatively, but not fully, reserved for the first restoration channel;
assigning fourth spectral resources for the second restoration channel, the fourth spectral resources comprising fourth excess spectral resources that are tentatively, but not fully, reserved for the second restoration channel;
wherein the third excess spectral resources are assigned to be spectrally contiguous to the fourth excess spectral resources.

3. The method according to claim 2, further comprising assigning a first occupation likelihood to the first excess spectral resources and a second occupation likelihood to the fourth excess spectral resources, wherein the first occupation likelihood represents a probability that the first excess spectral resources will be required by the first communication channel, and wherein the second occupation likelihood represents a probability that the fourth excess spectral resources will be required by the second restoration channel, wherein the assigning of the first spectral resources comprises assigning, in accordance with the first occupation likelihood, a spectral position of the first excess spectral resources, and wherein the assigning of the fourth spectral resources comprises assigning, in accordance with the second occupation likelihood, a spectral position of the fourth excess spectral resources.

4. The method according to claim 1, wherein the first transmission format of the first communication channel is a first transmission modulation format, and the second transmission format of the first communication channel is a second transmission modulation format that is different from the first transmission modulation format by at least one characteristic.

5. The method according to claim 2, further comprising receiving monitoring results pertaining to a performance of at least one of the first communication channel and the second communication channel, and in accordance with the monitoring results, re-assigning at least one of the first excess spectral resources, the second excess spectral resources, the third excess spectral resources, and the fourth excess spectral resources.

6. The method according to claim 4, further comprising at least one of:
the first transmission modulation format is 16-QAM, and the second transmission modulation format is one of 8-QAM and QPSK;
the first transmission modulation format is a first order of QAM, and the second transmission modulation format is a second order of QAM that is lower than the first order of QAM;
the second transmission modulation format is 8-QAM, and the first transmission modulation format is a transmission modulation format of higher-order than 8-QAM;
the second transmission modulation format is QPSK, and the first transmission modulation format is a transmission modulation format of higher-order than QPSK.

7. The method according to claim 1, further comprising assigning at least one occupation likelihood to at least the first excess spectral resources, wherein the at least one occupation likelihood represents a probability that the first excess spectral resources will be required by the first communication channel, wherein the assigning of the first spectral resources comprises assigning a spectral position of the first excess spectral resources in accordance with the at least one occupation likelihood.

8. The method according to claim 1, further comprising receiving monitoring results pertaining to a performance of at least one of the first communication channel and the second communication channel, and in accordance with the monitoring results, re-assigning at least a portion of at least one of the assigned first spectral resources and the assigned second spectral resources.

9. The method according to claim 8, further comprising releasing at least a portion of at least one of the first excess spectral resources and the second excess spectral resources, in accordance with the monitoring results.

10. The method according to claim 8, further comprising assigning at least a portion of at least one of the first excess spectral resources and the second excess spectral resources to, for a fourth communication channel, at least one of:
tentatively reserve, for the fourth communication channel, the at least a portion of at least one of the first excess spectral resources and the second excess spectral resources;
enable the fourth communication channel to communicate traffic using the at least a portion of at least one of the first excess spectral resources and the second excess spectral resources.

11. The method according to claim 10, wherein the at least a portion of of at least one of the first excess spectral resources and the second excess spectral resources is assigned in relation to the fourth communication channel in accordance with at least one of a priority parameter attributed to the fourth communication channel and an occupation likelihood attributed to the at least a portion of excess spectral resources, wherein the occupation likelihood represents one of:
a probability that the at least a portion of excess spectral resources will be required by at least one of the first communication channel and the second communication channel;
a probability that the at least a portion of excess spectral resources will be required by the first communication channel;
a probability that the at least a portion of excess spectral resources will be required by the second communication channel.

12. A computer program comprising computer-readable instructions embedded on a non-transitory computer-readable medium, wherein the computer-readable instructions are adapted, when read on a computer, to implement a method according to claim 11.

13. The method according to claim 1, wherein each of the first communication channel, the second communication channel, and the third communication channel, is an optical communication channel.

14. The method according to claim 1, wherein at least one of:
the at least a portion of the first fully reserved spectral resources of the first communication channel used to communicate traffic according to the second transmission format of the first communication channel is, at least in part, a same portion of the first fully reserved spectral resources as the at least a portion of the first fully reserved spectral resources of the first communication channel used to communicate traffic according to the first transmission format of the first communication channel;
the at least a portion of the first fully reserved spectral resources of the second communication channel used to communicate traffic according to the second transmission format of the second communication channel is, at least in part, a same portion of the first fully reserved spectral resources as the at least a portion of the first fully reserved spectral resources of the second communication channel used to communicate traffic according to the first transmission format of the second communication channel.

15. A system for assigning spectral resources, comprising:
an assignment unit configured to:
assign first spectral resources for a first communication channel, the first spectral resources comprising:
first fully reserved spectral resources that are fully reserved for the first communication channel; and
first excess spectral resources tentatively reserved for the first communication channel;
wherein the assignment of the first spectral resources enables the first communication channel to:
communicate traffic according to a first transmission format of the first communication channel using, to the exclusion of the first excess spectral resources, at least a portion of the first fully reserved spectral resources; and
communicate traffic according to a second transmission format of the first communication channel using at least a portion of the first fully reserved spectral resources and at least a portion of the first excess spectral resources, the second transmission format of the first communication channel being an alternative transmission format relative to the first transmission format of the first communication channel;

assign second spectral resources for a second communication channel, the second spectral resources comprising:

second fully reserved spectral resources that are fully reserved for the second communication channel; and second excess spectral resources tentatively reserved for the second communication channel;

wherein the assignment of the second spectral resources enables the second communication channel to:

communicate traffic according to a first transmission format of the second communication channel using, to the exclusion of the second excess spectral resources, at least a portion of the second fully reserved spectral resources; and communicate traffic according to a second transmission format of the second communication channel using at least a portion of the second fully reserved spectral resources and at least a portion of the second excess spectral resources, the second transmission format of the second communication channel being an alternative transmission format relative to the first transmission format of the second communication channel;

assign third spectral resources fully reserved for a third communication channel;

wherein the first excess spectral resources are assigned to be spectrally contiguous to the second excess spectral resources; and wherein the first spectral resources, the second spectral resources, and the third spectral resources are assigned such that the third spectral resources are spectrally contiguous to at least one of:

the first fully reserved spectral resources;

the second fully reserved spectral resources.

16. The system according to claim 15, wherein the at least one of software and firmware of the assignment unit is further adapted to, when executed by the assignment unit, enable the assignment unit to:

assign a first restoration channel for the first communication channel;

assign a second restoration channel for the second communication channel; and assigning third spectral resources for the first restoration channel, the third spectral resources comprising third excess spectral resources that are tentatively, but not fully, reserved for the first restoration channel;

assign fourth spectral resources for the second restoration channel, the fourth spectral resources comprising fourth excess spectral resources that are tentatively, but not fully, reserved for the second restoration channel;

wherein the third excess spectral resources are assigned to be spectrally contiguous to the fourth excess spectral resources.

17. The system according to claim 16, wherein the at least one of software and firmware of the assignment unit is further adapted to, when executed by the assignment unit, enable the assignment unit to assign a first occupation likelihood to the first excess spectral resources and a second occupation likelihood to the fourth excess spectral resources, wherein the first occupation likelihood represents a probability that the first excess spectral resources will be required by the first communication channel, and wherein the second occupation likelihood represents a probability that the fourth excess spectral resources will be required by the second restoration channel, wherein the assigning of the first spectral resources comprises assigning, in accordance with the first occupation likelihood, a spectral position of the first excess spectral resources, and wherein the assigning of the fourth spectral resources comprises assigning, in accordance with the second occupation likelihood, a spectral position of the fourth excess spectral resources.

18. The system according to claim 15, wherein the at least one of software and firmware of the assignment unit is further adapted to, when executed by the assignment unit, enable the assignment unit to assign at least one occupation likelihood to at least a portion of at least the first excess spectral resources, wherein the at least one occupation likelihood represents at least one of:

a probability that the at least a portion of at least the first excess spectral resources will be required by the first communication channel;

a probability that the at least a portion of at least the first excess spectral resources will be required by the second communication channel;

a probability that the at least a portion of at least the first excess spectral resources will be required by at least one of a plurality of communication channels;

wherein the assignment of the first spectral resources comprises assigning a spectral position of the at least a portion of at least the first excess spectral resources in accordance with the at least one occupation likelihood.

19. The system according to claim 15, further comprising:

a monitoring unit configured to:

receive monitoring results pertaining to a performance of at least one of the first communication channel and the second communication channel, and communicate the monitoring results to the assignment unit; and wherein the at least one of software and firmware of the assignment unit is further adapted to, when executed by the assignment unit, enable the assignment unit to re-assign at least a portion of at least one of the assigned first spectral resources and the assigned second spectral resources in accordance with the monitoring results.

20. The system according to claim 15, wherein the at least one of software and firmware of the assignment unit is further adapted to, when executed by the assignment unit, enable the assignment unit to assign at least a portion of at least one of the first excess spectral resources and the second excess spectral resources to, for a fourth communication channel, at least one of:

tentatively reserve, for the fourth communication channel, the at least a portion of at least one of the first excess spectral resources and the second excess spectral resources;

enable the fourth communication channel to communicate traffic using the at least a portion of at least one of the first excess spectral resources and the second excess spectral resources.

21. The system according to claim 15, further comprising:

a monitoring unit configured to:

receive monitoring results pertaining to a performance of at least one of the first communication channel and the second communication channel, and communicate the monitoring results to the assignment unit; and wherein the at least one of software and firmware of the assignment unit is further adapted to, when executed by the assignment unit, enable the assignment unit to re-assign at least a portion of at least one of the assigned first spectral resources and the assigned second spectral resources in accordance with the monitoring results.

22. The system according to claim 21, wherein the system further comprises a format manager unit configured to, in accordance with the monitoring results, change at least one of:
- a transmission format of the first communication channel from the first transmission format of the first communication channel to the second transmission format of the first communication channel;
- a transmission format of the second communication channel from the first transmission format of the second communication channel to the second transmission format of the second communication channel.

23. The system according to claim 15, wherein the first transmission format of the first communication channel is a first transmission modulation format, and the second transmission format of the first communication channel is a second transmission modulation format that is different from the first transmission modulation format by at least one characteristic.

24. The system according to claim 23, further comprising at least one of:
- the first transmission modulation format is 16-QAM, and the second transmission modulation format is one of 8-QAM and QPSK;
- the first transmission modulation format is a first order of QAM, and the second transmission modulation format is a second order of QAM that is lower than the first order of QAM;
- the second transmission modulation format is 8-QAM, and the first transmission modulation format is a transmission modulation format of higher-order than 8-QAM;
- the second transmission modulation format is QPSK, and the first transmission modulation format is a transmission modulation format of higher-order than QPSK.

25. The system according to claim 15, wherein each of the first communication channel, the second communication channel, and the third communication channel, is an optical communication channel.

26. The system according to claim 15, wherein at least one of:
- the at least a portion of the first fully reserved spectral resources of the first communication channel used to communicate traffic according to the second transmission format of the first communication channel is, at least in part, a same portion of the first fully reserved spectral resources as the at least a portion of the first fully reserved spectral resources of the first communication channel used to communicate traffic according to the first transmission format of the first communication channel;
- the at least a portion of the first fully reserved spectral resources of the second communication channel used to communicate traffic according to the second transmission format of the second communication channel is, at least in part, a same portion of the first fully reserved spectral resources as the at least a portion of the first fully reserved spectral resources of the second communication channel used to communicate traffic according to the first transmission format of the second communication channel.

* * * * *